May 11, 1943.   J. L. BREESE   2,319,035
VENTILATING APPARATUS AND METHOD
Filed Feb. 14, 1940
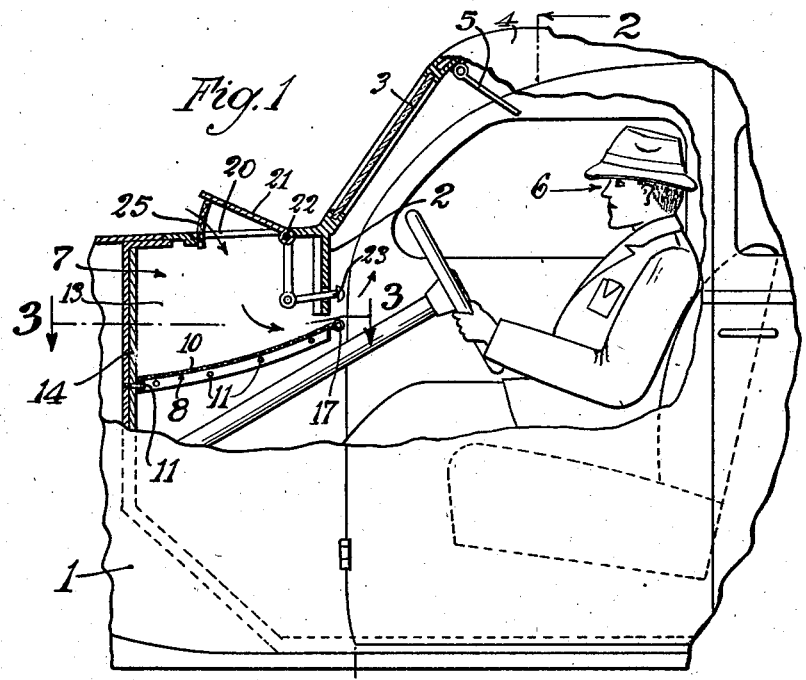
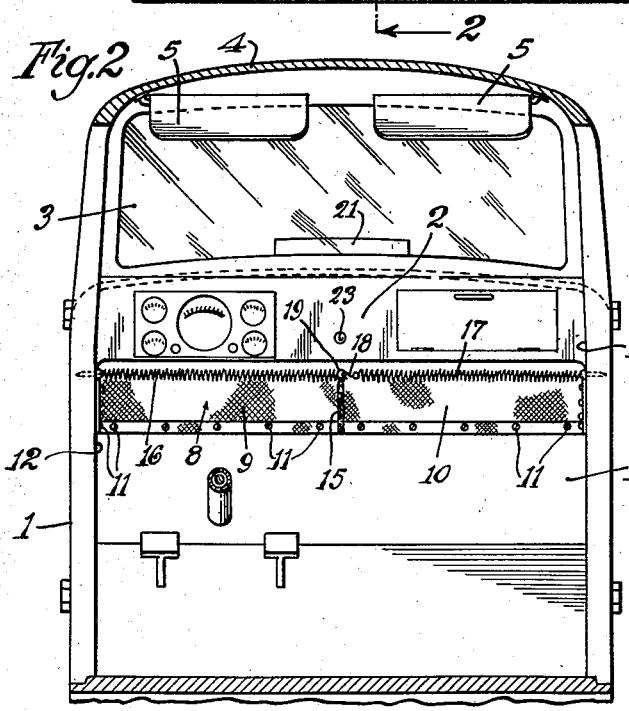
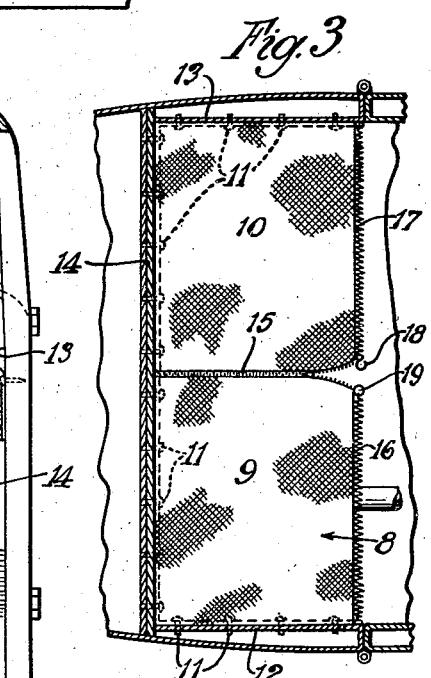
Inventor
James L. Breese
by Parker & Carter
Attorneys Patented May 11, 1943

2,319,035

UNITED STATES PATENT OFFICE 2,319,035

VENTILATING APPARATUS AND METHOD

James L. Breese, Sante Fe, N. Mex.

Application February 14, 1940, Serial No. 318,870

6 Claims. (Cl. 98—2)

My invention relates to an improvement in air circulation means for automobiles and the like.

One purpose is the provision of means for varying the temperature and velocity of the air in different parts of the vehicle and, for example, for delivering relatively cool air toward the face of the driver or the faces of other passengers in the front or rear.

Another purpose is the provision of means for directing a cooling flow of air directly upwardly along the inner face of the windshield, preferably from a point or area below the instrument panel.

Another purpose is the provision of means for controlling the direction of flow of outside air whereby both in summer and in winter outside air may be directed toward the face of the operator or toward any other part of the car or any object which it is desirable to keep relatively cool.

Another purpose is the provision of means for providing a plenum chamber forwardly of the instrument panel or board of an automobile.

Another purpose is the provision of such a plenum chamber which may be readily opened for access to wiring or other connections forwardly of the instrument panel.

Other purposes will appear from time to time in the course of the specification and claims.

I illustrate my invention more or less diagrammatically in the accompanying drawing wherein:

Fig. 1 is a partial side elevation with parts in section;

Fig. 2 is a section on the line 2—2 of Fig. 1; and

Fig. 3 is a section on the line 3—3 of Fig. 1.

Like parts are indicated by like characters throughout the specification and drawing.

Referring to the drawing, 1 generally indicates an automobile, 2 being the instrument panel, 3 the windshield, 4 the roof, and 5 a hinged or adjustable sun visor. 6 generally indicates the head or face of the driver. 7 indicates a compartment forwardly of the instrument panel having a bottom portion or wall 8, which is herein shown as of flexible material. It may, for example, include two separate portions of cloth of the like 9, 10, permanently or removably secured, as by any suitable screws, bolts, or the like, 11, to the side panels 12, 13 of the body, and to the wall 14, forming the front of the cowl and separating the body space from the engine housing.

The two sections 9 and 10 may be removably secured together, for example by a "zipper" connection 15. Any suitable transversely extending tension member may be employed to support the rear edge of the plenum chamber wall so formed. I illustrate, for example, springs 16, 17, associated with the cloth panels 9 and 10, respectively, which may be removably secured together, for example by the hook 18 and eye 19.

20 indicates an inlet through the top of the cowl, and 21 a removable closure therefor, which may be hinged as at 22, and may be provided with any suitable control member 23, extending through the instrument board, whereby the operator within the car may open or close the aperture 20.

It will be understood that, whereas I have shown two flexible panels 9 and 10, I may, if I desire, employ a single panel extending entirely across the space within the cowl and below the lower edge of the instrument board 2.

It will be realized that, whereas I have described and illustrated a practical and operative embodiment of my invention and the method for carrying it out, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

It will be understood that where I employ the term "fabric," I wish it to be interpreted as of sufficient breadth to include cloth, rubberized fabric, and other similarly flexible substances.

It will be understood that where in the claims I employ the term readily flexible in connection with supporting means, I mean the use of elements or substances of a degree of flexibility warranting their use with cloth, rubberized fabric or the like. Whereas a coil spring is a practical solution of the supporting problem, other flexible members or substances may also be employed. I wish to emphasize, however, as a differentiation between my invention and the prior art that I employ a bottom plenum chamber which is so flexible that when released, it can readily be folded downwardly or laterally away from its normal position or in fact will drop freely away from its normal position and permit the operator to have free access to the plenum chamber and to the rear of the instrument panel.

The use and operation of my invention are as follows:

In the summer or in hot weather, there is a natural moisture on the face of an automobile driver which may be evaporated, under the influence of a stream of inflowing air. This evaporation results in a cooling sensation and a substantial reduction of the surface temperature of the part of the body struck by the actual stream of air. My device herein shown provides means for directing an inflowing stream of outside air, slightly heated or not heated at all, toward the face of the user. Thus my device may be employed for driving in summer or in hot countries.

For winter driving, where it is advantageous or necessary to heat the air inside the car, or to draw heated air into the space around the driver, it has been found that to keep the body properly warm it is necessary to have the air at a temperature which is unpleasant on the face and which may cause discomfort and even dizziness and drowsiness. My invention is directed to the successive or the combined combination of delivering air into a car at two different temperatures.

It will be understood, of course, that any suitable heating means may be employed, but since such heating means are conventional, they are not indicated herein. It will be understood, however, that the air passing into the plenum chamber and directed upwardly through the gap below the bottom of the instrument board 2, may be suitably heated.

In the operation of the system, the car is under pressure, the windows and doors all being preferably closed. The air as it enters can be filtered and any conventional filter structure may be employed. For example, any suitable filter arrangement may be mounted upon the closure 21, as shown at 25.

A further effect of the maintenance of pressure in the car is to prevent any entry by suction of dirty air from the engine or from the exhaust or from the road. In the normal car, where open ventilation is employed, as in the so-called "no draft" ventilation, there is a suction of exhaust gases and dirt and dust into the interior of the car. Some may come from beneath the hood of the engine, some may come through the door and windows, and some through leaks in the body or floor.

My apparatus and method entirely prevent this and, instead, I maintain a pressure in the car, since all the doors and windows are kept closed and additional outside air is admitted. There is sufficient leakage in the windows and doors to permit the excess air out through them. The inflowing air being filtered, the dust is eliminated. There is, therefore, no suction of dust, gases or the like into the car. This is the advantage of maintaining the car under pressure, in contrast to the maintenance of a constant vacuum by so-called "no draft" ventilation.

Furthermore, the closing of the windows practically eliminates outside noise and the definite pulsation effect which takes place with an open window.

In operation I maintain the interior atmosphere of a car at a substantially constant pressure. I maintain a plenum chamber across the front of the car, the pressure within which is built up, through the aperture 20, in response to the forward movement of the car. The pressure built up in the plenum chamber forwardly of the instrument board is delivered to the interior of the car body, and an excess pressure in the car body is maintained. It should be understood that, in any normally equipped car, when moving, air pressure is constantly changing, due to eddy currents around the window frames. This sets up a pulsation which is very disagreeable in high speed driving. My structure eliminates this and prevents pressure pulsation, and maintains a substantially uniform interior pressure in the car. The air may be delivered upwardly through the aperture below the instrument board 2, and against the visor 5. It may be then directed to the face of the user by setting the visor 5 at the proper angle.

The plenum chamber is easily accessible since the tension member 16, 17 may be disconnected and the two panels 9 and 10 may be separated. Thus it is easy to have access to any fittings or connections at the rear of the instrument panel, or to whatever heating means is employed, if any.

I claim:

1. In combination with a normally closed vehicle having a cowl and an instrument panel, a plenum chamber within the cowl and located forwardly of the instrument panel, a flexible wall for said plenum chamber located forwardly of and beneath the instrument panel, the rear edge of the plenum chamber being located adjacent the bottom of the instrument panel, and a tension member including spring means extending from side to side of the vehicle, for supporting said rear edge of the plenum chamber.

2. In combination with a normally closed vehicle having a cowl and an instrument panel, a plenum chamber defined in part by the cowl and the instrument panel, a flexible generally horizontal lower wall for said plenum chamber located forwardly of and beneath the instrument panel and having its front and side edges secured to said cowl, the rear edge of said flexible wall being located adjacent the bottom of the instrument panel and being separated therefrom by an air gap which extends substantially across the body of the vehicle and constitutes an air inlet, and a readily flexible support for said flexible wall extending transversely in general parallelism with the lower edge of the instrument panel, said flexible lower wall including a plurality of portions abutting along a line generally parallel with the length of the vehicle, and means for readily attaching and detaching said portions along said line, said wall being of a material of the order of flexibility of cloth.

3. In combination with a normally closed vehicle having a cowl and an instrument panel, a plenum chamber defined in part by the cowl and the instrument panel, a flexible generally horizontal lower wall for said plenum chamber, of fabric, located forwardly and beneath the instrument panel and having its front and side edges secured to said cowl, the rear edge of the flexible wall being located adjacent the bottom of the instrument panel and being separated therefrom by an air gap, and readily flexible extensible yielding supporting means for the rear edge of said flexible wall, said supporting means extending substantially the entire width of the vehicle and along the rear edge of said flexible wall, said wall being of a material of the order of flexibility of cloth.

4. In combination with a normally closed vehicle having a cowl and an instrument panel, a plenum chamber defined in part by the cowl and the instrument panel, a flexible generally horizontal lower wall for said plenum chamber, of fabric, located forwardly and beneath the instrument panel and having its front and side edges secured to said cowl, the rear edge of said flexible wall being located adjacent the bottom of the instrument panel and being separated therefrom by an air gap, and readily flexible supporting means for the rear edge of said flexible wall, said supporting means extending substantially the entire width of the vehicle and along the rear edge of said flexible wall, said flexible wall including a plurality of flexible panels removably secured to each other along a line generally parallel with the length of the vehicle, said panels, when separated, being adapted to permit access to the space within the plenum chamber, said wall being of a material of the order of flexibility of cloth.

5. In combination with a normally closed vehicle having a cowl and an instrument panel, a plenum chamber within the cowl and located forwardly of the instrument panel, a flexible generally horizontal lower wall for said plenum chamber located forwardly of and beneath the instrument panel and having its front and side edges secured to said cowl, the rear edge of the plenum chamber being located adjacent the bottom of the instrument panel, and a tension member including extensible spring means extending from side to side of the vehicle, for supporting said rear edge of the plenum chamber, said wall being divided into a plurality of separate abutting members, and means for detachably securing said abutting members together.

6. In combination with a normally closed vehicle having a cowl and an instrument panel, a plenum chamber within the cowl and located forwardly of the instrument panel, a flexible, generally horizontal lower wall for said plenum chamber located forwardly of and beneath the instrument panel, the rear edge of the plenum chamber being located adjacent the bottom of the instrument panel, and a tension member including a readily detachable flexible extensible support extending from side to side of the vehicle, for supporting said rear edge of the plenum chamber.

JAMES L. BREESE.